(12) United States Patent
Chae

(10) Patent No.: US 11,211,045 B2
(45) Date of Patent: Dec. 28, 2021

(54) ARTIFICIAL INTELLIGENCE APPARATUS AND METHOD FOR PREDICTING PERFORMANCE OF VOICE RECOGNITION MODEL IN USER ENVIRONMENT

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 16/486,028

(22) PCT Filed: May 29, 2019

(86) PCT No.: PCT/KR2019/006447
§ 371 (c)(1),
(2) Date: Aug. 14, 2019

(87) PCT Pub. No.: WO2020/241923
PCT Pub. Date: Dec. 3, 2020

(65) Prior Publication Data
US 2021/0183364 A1 Jun. 17, 2021

(51) Int. Cl.
*G10L 15/20* (2006.01)
*G10L 15/01* (2013.01)
(Continued)

(52) U.S. Cl.
CPC .......... *G10L 15/01* (2013.01); *G06N 20/00* (2019.01); *G10L 15/063* (2013.01); *G10L 15/20* (2013.01)

(58) Field of Classification Search
CPC ....... G10L 15/01; G10L 15/063; G10L 15/20; G06N 20/00
(Continued)

(56) References Cited

U.S. PATENT DOCUMENTS 9,595,997 B1 * 3/2017 Yang .................. G10L 21/0208
10,331,402 B1 * 6/2019 Spector ................. G06F 3/167
(Continued)

FOREIGN PATENT DOCUMENTS

CN 110099246 A * 8/2019
JP 4510517 B2 7/2010
(Continued)

OTHER PUBLICATIONS

D. Prabakaran and R. Shyamala, "A Review On Performance Of Voice Feature Extraction Techniques," 2019 3rd International Conference on Computing and Communications Technologies (ICCCT), 2019, pp. 221-231, doi: 10.1109/ICCCT2.2019.8824988. (Year: 2019).*
(Continued)

*Primary Examiner* — Bharatkumar S Shah
(74) *Attorney, Agent, or Firm* — Birch, Stewart, Kolasch & Birch, LLP

(57) ABSTRACT

Provided is an artificial intelligence apparatus for predicting a performance of a voice recognition model in a user environment including: a memory configured to store a performance prediction model; and a processor configured to: obtain first controlled environment data including first controlled environment factors corresponding to a first controlled voice recognition environment and a first controlled voice recognition performance of a target voice recognition model in the first controlled voice recognition environment; obtain first user environment factors corresponding to a first user environment, in which the performance is to be predicted; predict, using the performance prediction model, a first user voice recognition performance of the target voice recognition model in the first user voice recognition environment from the obtained first controlled environment data
(Continued)

and the first user environment factors; and output the predicted first user voice recognition performance.

8 Claims, 9 Drawing Sheets

(51) Int. Cl.
*G06N 20/00* (2019.01)
*G10L 15/06* (2013.01)

(58) Field of Classification Search
USPC .......................................................... 704/243
See application file for complete search history.

(56) References Cited

U.S. PATENT DOCUMENTS

| | | | |
|---|---|---|---|
| 2014/0067387 A1 | 3/2014 | Li et al. | |
| 2015/0317998 A1 | 11/2015 | Lee et al. | |
| 2018/0285065 A1* | 10/2018 | Jeong | G06F 3/167 |
| 2018/0322872 A1* | 11/2018 | Cha | G10L 15/22 |

FOREIGN PATENT DOCUMENTS

| | | |
|---|---|---|
| KR | 10-2008-0066129 A | 7/2008 |
| KR | 10-2015-0126214 A | 11/2015 |
| KR | 10-2017-0140680 A | 12/2017 |

OTHER PUBLICATIONS

Y. Tao, "An Intelligent Voice Interaction Model Based on Mobile Teaching Environment," 2019 International Conference on Intelligent Transportation, Big Data & Smart City (ICITBS), 2019, pp. 377-380, doi: 10.1109/ICITBS.2019.00099. (Year: 2019).*

D. Prabakaran and R. Shyamala, "A Review On Performance Of Voice Feature Extraction Techniques," 2019 3rd International Conference on Computing and Communications Technologies (ICCCT), 2019, pp. 221-231, doi: 10.1109/ICCCT2.2019.8824988. (Year: 2019) (Year: 2019).*

* cited by examiner

- Prior Art -

FIG. 5

| | UTTERANCE DISTANCE | UTTERANCE VOLUME | UTTERANCE DIRECTION | ECHO | NOISE | SPACE SIZE | ... | VOICE RECOGNITION PERFORMANCE |
|---|---|---|---|---|---|---|---|---|
| CONTROLLED VOICE RECOGNITION ENVIRONMENT (501) | 3m | 5dB | MACHINE DIRECTION | LITTLE | 1dB | 36.3m² | | O |
| | 2m | 7dB | MACHINE DIRECTION | A LOT | 1.5dB | 33m² | | O |
| | 2.5m | 8dB | MACHINE DIRECTION | LITTLE | 2dB | 26.4m² | | O |
| USER VOICE RECOGNITION ENVIRONMENT (502) | 2m | 6dB | LATERAL DIRECTION | A LOT | 3dB | 46.2m² | | X |
| | 4.5m | 3dB | LATERAL DIRECTION | A LOT | 2dB | 52.8m² | | X |
| | 7m | 4dB | REAR DIRECTION | LITTLE | 3dB | 59.4m² | | O |

Columns: 511, 512, 513, 514, 515, 516, 517

ARTIFICIAL INTELLIGENCE APPARATUS AND METHOD FOR PREDICTING PERFORMANCE OF VOICE RECOGNITION MODEL IN USER ENVIRONMENT

CROSS REFERENCE TO RELATED APPLICATIONS

This application is the National Phase of PCT International Application No. PCT/KR2019/006447, filed on May 29, 2019, which is hereby expressly incorporated by reference into the present application.

BACKGROUND

1. Field

The present invention relates to an artificial intelligence apparatus and a method for predicting a performance of a voice recognition model in a user environment. Specifically, the present invention relates to an artificial intelligence apparatus and a method for predicting a performance of a voice recognition model in a user environment based on a voice recognition performance in a controlled voice recognition environment of the corresponding voice recognition model.

2. Related Art

Recently, services to which a voice recognition technology such as an artificial intelligence speaker, voice control, a voice secretary, or the like is increasing. Such a voice recognition function may be implemented via a voice recognition model or a voice recognition engine.

Developing the voice recognition model includes measuring a voice recognition performance of the developed voice recognition model and modifying or optimizing the voice recognition model based on the measured voice recognition performance to improve the voice recognition performance. However, environments for measuring the voice recognition performance of the voice recognition model only includes limited and controlled environments, so that various user voice recognition environments may not be reflected thereto. Therefore, in order to improve the performance of the voice recognition model in the user voice recognition environment, the voice recognition performance in the user voice recognition environment should be separately measured and collected, thereby consuming a lot of time and cost.

SUMMARY

A purpose of the present invention is to provide an artificial intelligence apparatus and a method for predicting voice recognition performances in various user environments of a voice recognition model based on a voice recognition performance in a controlled voice recognition environment of the corresponding voice recognition model.

Further, another purpose of the present invention is to provide an artificial intelligence apparatus and a method for predicting voice recognition performances in various user environments of a new voice recognition model.

An embodiment of the present invention provides an artificial intelligence apparatus and a method for predicting a user voice recognition performance based on a user environment factor when controlled environment data corresponding to a controlled voice recognition environment for a specific voice recognition model is input using a performance prediction model that predicts the user voice recognition performance corresponding to the user environment factor from controlled environment factors, a controlled voice recognition performance corresponding to the controlled environment factors, and user environment factors for various voice recognition models.

Further, an embodiment of the present invention provides an artificial intelligence apparatus and a method using a performance prediction model that generates a predicted value of a voice recognition performance in a user voice recognition environment of a particular voice recognition model from controlled environment factors, the controlled voice recognition performance, and the user environment factors.

According to various embodiments of the present invention, even when only the voice recognition performance in the controlled voice recognition environment of the specific voice recognition model is identified, voice recognition performances in various user environments may be predicted and a voice recognition model having a high performance in the user environment may be easily developed using the predicted voice recognition performances in the various user environments.

Further, according to various embodiments of the present invention, even when only a voice recognition performance in a controlled voice recognition environment of a new voice recognition model is identified, voice recognition performances in various user environments may be predicted with a high accuracy.

BRIEF DESCRIPTION OF DRAWINGS

FIG. 5 is a table illustrating a voice recognition environment and a voice recognition performance in the voice recognition environment.

DETAILED DESCRIPTIONS

Figure 1:
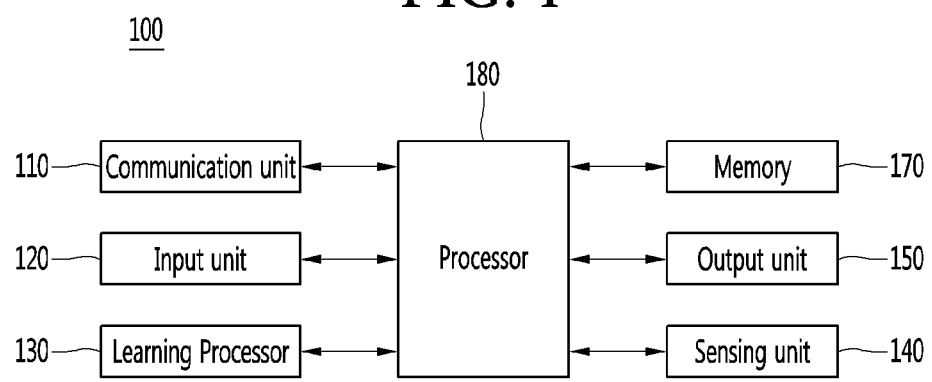
FIG. 1 is a block diagram illustrating an AI apparatus according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
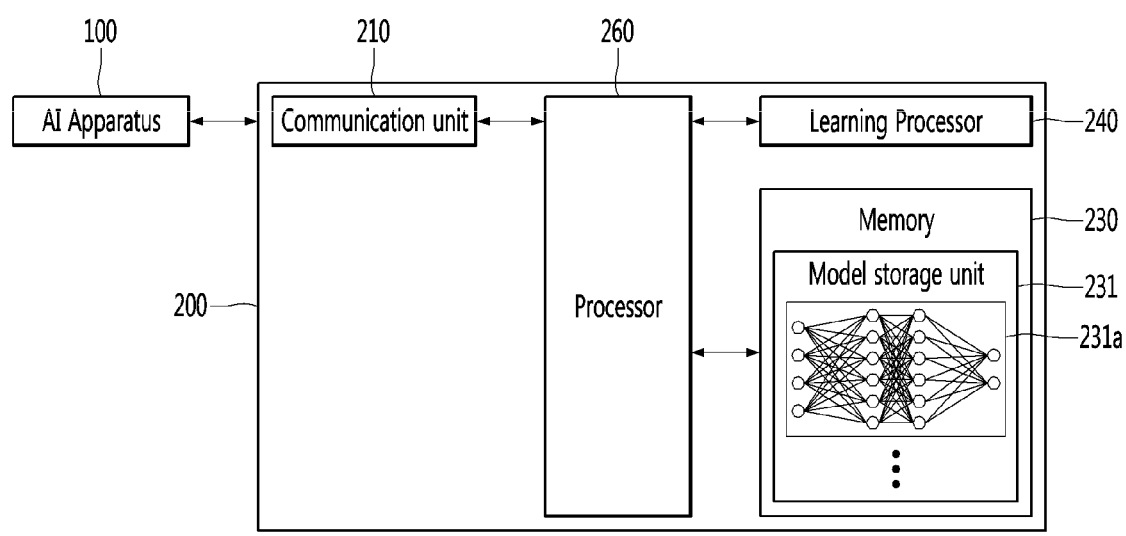
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
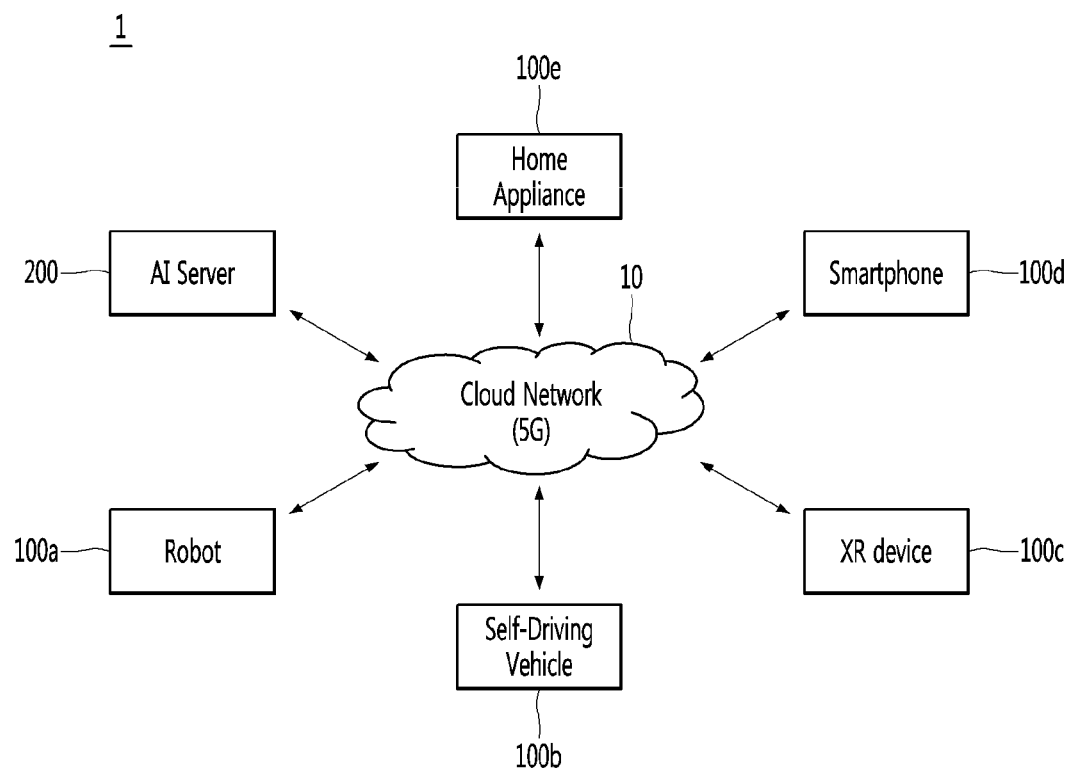
FIG. 3 is a view illustrating an AI system according to an embodiment of the present invention.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

At this time, the AI server 200 may learn the artificial neural network according to the machine learning algorithm instead of the AI apparatuses 100a to 100e, and may directly store the learning model or transmit the learning model to the AI apparatuses 100a to 100e.

At this time, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
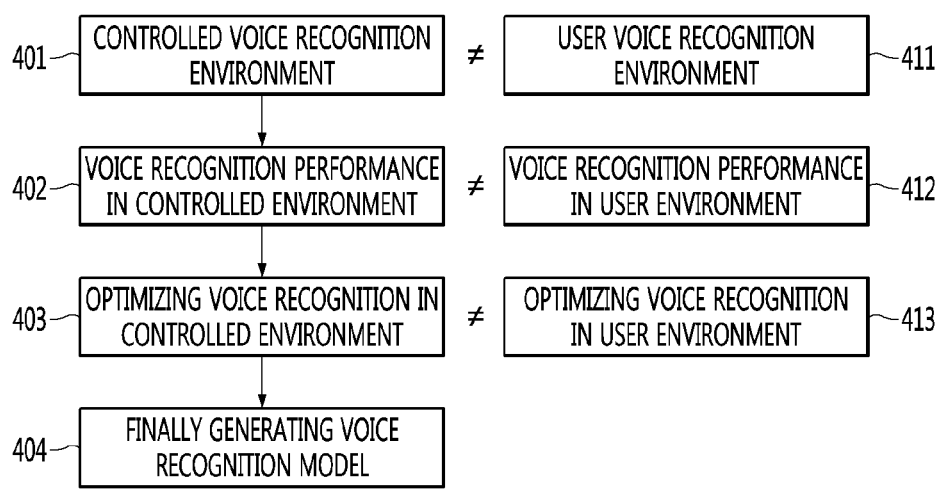
FIG. 4 is a view illustrating a conventional method for generating a voice recognition model.

FIG. 4 is a view illustrating a conventional method for generating a voice recognition model.

Referring to FIG. 4, in the conventional method for generating the voice recognition model, a recognition performance 402 of a voice recognition model generated in a controlled voice recognition environment (development environment, 401) is measured to optimize 403 the voice recognition model to have a high recognition performance in the controlled voice recognition environment, thereby finally generating 404 the voice recognition model.

The controlled voice recognition environment may refer to a pre-designed environment for measuring the voice recognition performance of the voice recognition model. For example, the controlled voice recognition environment may include a voice recognition studio.

However, the controlled voice recognition environment 401 is different from a user voice recognition environment 411. Further, a voice recognition performance 412 in the user voice recognition environment 411 is different from the voice recognition performance 402 in the controlled voice recognition environment 401. Thus, the optimizing 403 of the voice recognition model in the controlled voice recognition environment 401 is entirely different from optimizing 413 of the voice recognition model in the user voice recognition environment 411. That is, the conventional method for generating the voice recognition model does not guarantee a recognition performance in the user voice recognition environment 411 the same level as that in the controlled voice recognition environment 401.

For example, even when a particular voice recognition model has a recognition performance of 96% in the voice recognition environment 401 controlled for a particular voice, a recognition performance may appear as 70% in the actual user voice recognition environment 411.

Here, the voice recognition performance may be represented as a percentage of successfully recognized words in input voice or may be represented as success or failure depending on whether the percentage of the successfully recognized words exceeds a certain threshold, but the present invention is not limited thereto. That is, the voice recognition performance may be measured and represented in various ways.

The user voice recognition environment may refer to entire conventional voice recognition environments using the voice recognition model, rather than a pre-designed environment for measuring the performance of the voice recognition model.

When developing the voice recognition model, it is important to realize the voice recognition performance in an actual-use environment. However, whenever new voice recognition models are developed, it is difficult to measure the voice recognition performance every time in the user voice recognition environment and optimize the voice recognition model.

Embodiments of the present invention to be described below propose a method for predicting a voice recognition performance in a particular user voice recognition environment based on information about a controlled voice recognition environment and a voice recognition performance in the controlled voice recognition environment even when a new voice recognition model is generated. Further, a method for predicting a voice recognition performance in a user voice recognition environment and generating a voice recognition model using the same.

FIG. 5 is a table illustrating a voice recognition environment and a voice recognition performance in the voice recognition environment.

Referring to FIG. 5, the voice recognition environment may be classified into a controlled voice recognition environment 501 and a user voice recognition environment 502, and each voice recognition environment 501 or 502 may be represented by environment factors representing a voice recognition environment.

The environment factors representing the voice recognition environment 501 or 502 may include at least one of an utterance distance 511, an utterance volume 512, an utterance direction 513, an echo 514, a noise 515, or a space size 516.

Further, a voice recognition performance 517 may be represented as a constant index indicating a performance of a voice recognition as described above, or may be represented as success (O) or failure (X) depending on whether a certain threshold is exceeded as described in FIG. 5.

Figure 6:
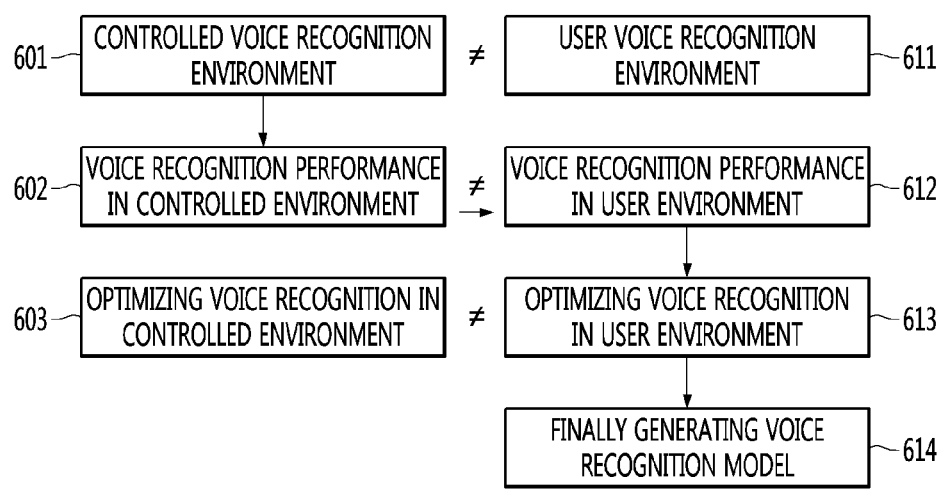
FIG. 6 is a view illustrating a method for generating a voice recognition model according to an embodiment of the present invention.

FIG. 6 is a view illustrating a method for generating a voice recognition model according to an embodiment of the present invention.

Referring to FIG. 6, in the method for generating the voice recognition model according to an embodiment of the present invention, a recognition performance 602 of a voice recognition model generated in a controlled voice recognition environment 601 is measured.

As described above, the controlled voice recognition environment 601 and a user voice recognition environment 611 are different from each other. Therefore, a voice recognition performance 612 in the user voice recognition environment 611 is predicted from the voice recognition performance 602 in the controlled voice recognition environment 601, using a performance prediction model to be described below. Then, the voice recognition model is optimized 613 in the user voice recognition environment 611 using the prediction result, thereby finally generating the voice recognition model 614.

Accordingly, in designing and generating the voice recognition model, a user (a developer) may easily predict the voice recognition performance in various user voice recognition environments by testing the voice recognition performance in the controlled voice recognition environment and may use the prediction result to generate a voice recognition model with a high voice recognition performance in an actual-use environment.

Figure 7:
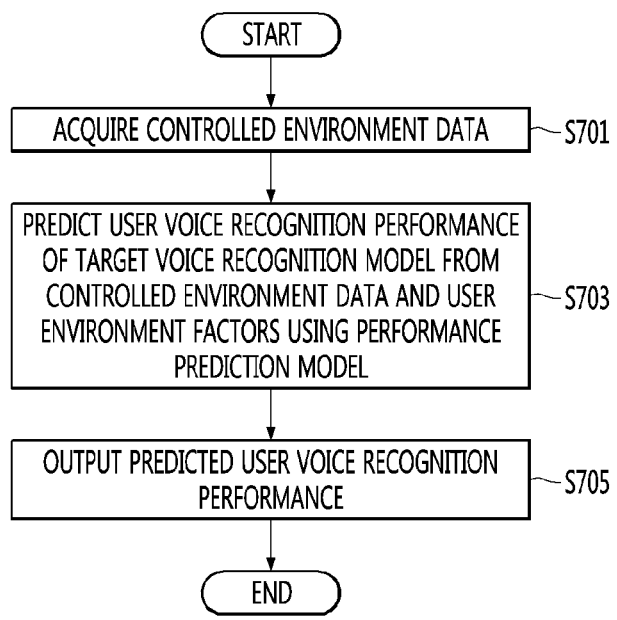
FIG. 7 is a flowchart illustrating a method for predicting a performance of a voice recognition model according to an embodiment of the present invention.

FIG. 7 is a flowchart illustrating a method for predicting a performance of a voice recognition model according to an embodiment of the present invention.

Referring to FIG. 7, the processor 180 of the artificial intelligence apparatus 100 acquires controlled environment data of a target voice recognition model in a controlled voice recognition environment (S701).

The controlled environment data may be received from external devices via the communication unit 110, received from the user via the input unit 120, or read from the memory 170.

The target voice recognition model refers to a voice recognition model that is a target whose voice recognition performance is to be determined.

Here, the target voice recognition model may be a new voice recognition model different from the existing voice recognition model.

However, the controlled voice recognition environment and the user voice recognition environment do not necessarily have to be exclusive, and the user voice recognition environment may include the controlled voice recognition environment.

The controlled environment data may include controlled environment factors corresponding to the controlled voice recognition environment and controlled voice recognition performance in the controlled voice recognition environment of a particular voice recognition model.

The controlled environment factors are factors that represent the controlled voice recognition environment. The controlled environment factors may include at least one of an utterance distance, an utterance volume, an utterance direction, an echo, a noise, or a space size.

Controlled environment data may be classified based on the voice recognition model and the controlled voice recognition environment.

For example, first controlled environment data may refer to controlled environment data corresponding to a first controlled voice recognition environment of a first voice recognition model, second controlled environment data may refer to controlled environment data corresponding to a second controlled voice recognition environment of the first voice recognition model, and third controlled environment data may refer to controlled environment data corresponding to a first controlled voice recognition environment of a second voice recognition model.

Here, controlled environment data acquired by the processor 180 is data about a target voice recognition model, which is used to predict a performance of the target voice recognition model in an arbitrary user voice recognition environment.

Then, the processor 180 of the artificial intelligence apparatus 100 predicts, using a performance prediction model, a user voice recognition performance of the target voice recognition model in the user voice recognition performance from the acquired controlled environment data and user environment factors corresponding to the user voice recognition environment in which the performance is to be predicted (S703).

The user environment factors are factors that represent the user voice recognition environment. The user environment factors may include at least one of an utterance distance, an utterance volume, an utterance direction, an echo, a noise, or a space size.

The performance prediction model may refer to a model that predicts a voice recognition performance in a particular user voice recognition environment of at least one voice recognition model using information about the voice recognition performance in the controlled voice recognition environment.

That is, the performance prediction model may generate a predicted value of the user voice recognition performance of the particular voice recognition model in the user voice recognition environment from the controlled environment factors corresponding to the controlled voice recognition environment for the particular voice recognition model, the controlled voice recognition performance of the particular voice recognition model in the controlled voice recognition environment, and the user environment factors corresponding to the user voice recognition environment.

Here, the performance prediction model may be learned using voice recognition performance result values for the at least one voice recognition model. Further, training data used to train the performance prediction model may include the voice recognition performance in the controlled voice recognition environment and the voice recognition performance in the user voice recognition environment.

Specifically, in the training data, the user voice recognition performance, which means the voice recognition performance in the user voice recognition environment, is labeled. Further, the performance prediction model may be trained in such a manner as to predict the user voice recognition performance from the controlled environment factors, the controlled voice recognition performance, and the user environment factor and compare the predicted user voice recognition performance the labeled user voice recognition performance to reduce an error.

Thus, when a particular voice recognition model is given, the performance prediction model may predict a voice recognition performance in arbitrary user voice recognition environment based on a voice recognition performance in a controlled voice recognition environment.

Here, the performance prediction model may be learned in the processor 180 or the learning processor 130 of the artificial intelligence apparatus 100 or in the learning processor 240 of the external artificial intelligence server 200.

Here, the performance prediction model may be used in a state stored in the memory 170 of the artificial intelligence apparatus 100.

Here, the performance prediction model may be used in a state stored in the memory 230 or the model storage unit 231 of the artificial intelligence server 200.

When the performance prediction model is used in the state stored in the artificial intelligence server 200, the processor 180 of the artificial intelligence apparatus 100 may transmit the controlled environment data and the user environment factors for the target voice recognition model to the artificial intelligence server 200 and receive the predicted value of the user voice recognition performance from the artificial intelligence serve 200.

Then, the processor 180 of the artificial intelligence apparatus 100 outputs the predicted user voice recognition performance (S705).

That is, the processor 180 may generate the predicted value of the user voice recognition performance for the target voice recognition model in the user voice recognition environment, and output the generated predicted value.

Accordingly, in designing and generating the voice recognition model, the user (the developer) may easily predict the voice recognition performance in various user voice recognition environments by testing the voice recognition performance in the controlled voice recognition environment.

Figure 8:
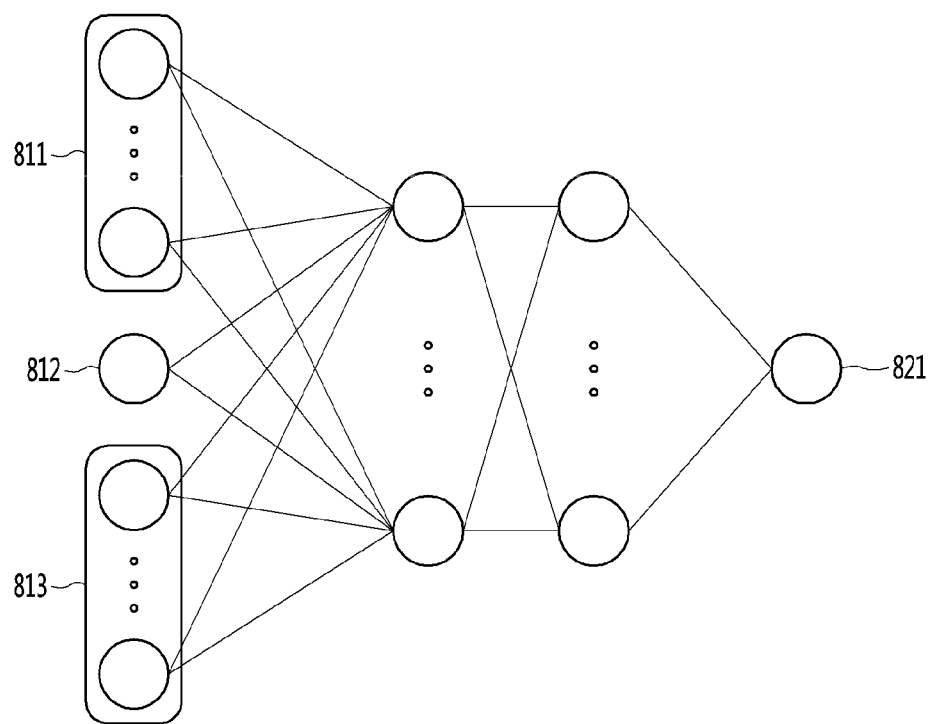
FIG. 8 is a view illustrating a performance prediction model according to an embodiment of the present invention.

FIG. 8 is a view illustrating a performance prediction model according to an embodiment of the present invention.

Referring to FIG. 8, a performance prediction model 801 according to one embodiment of the present invention may be composed of an artificial neural network and learned using a machine learning algorithm or a deep learning algorithm.

The performance prediction model 801 composed of the artificial neural network in FIG. 8 is merely an example, and a structure of each of an input layer, a hidden layer, and an output layer is not limited thereto.

Input features or input feature vectors of the performance prediction model 801 may include controlled environment factors 811 corresponding to a controlled voice recognition environment, a controlled voice recognition performance 812 in the controlled voice recognition environment for a particular voice recognition model, and user environment factors 813 corresponding to a user voice recognition environment in which the performance is predicted.

An output feature or output feature vector of the performance prediction model 801 may include a user voice recognition performance 821 in the user voice recognition environment for the particular voice recognition model.

Learning method and utilization method of the performance prediction model 801 will be described below with reference to FIG. 9.

Figure 9:
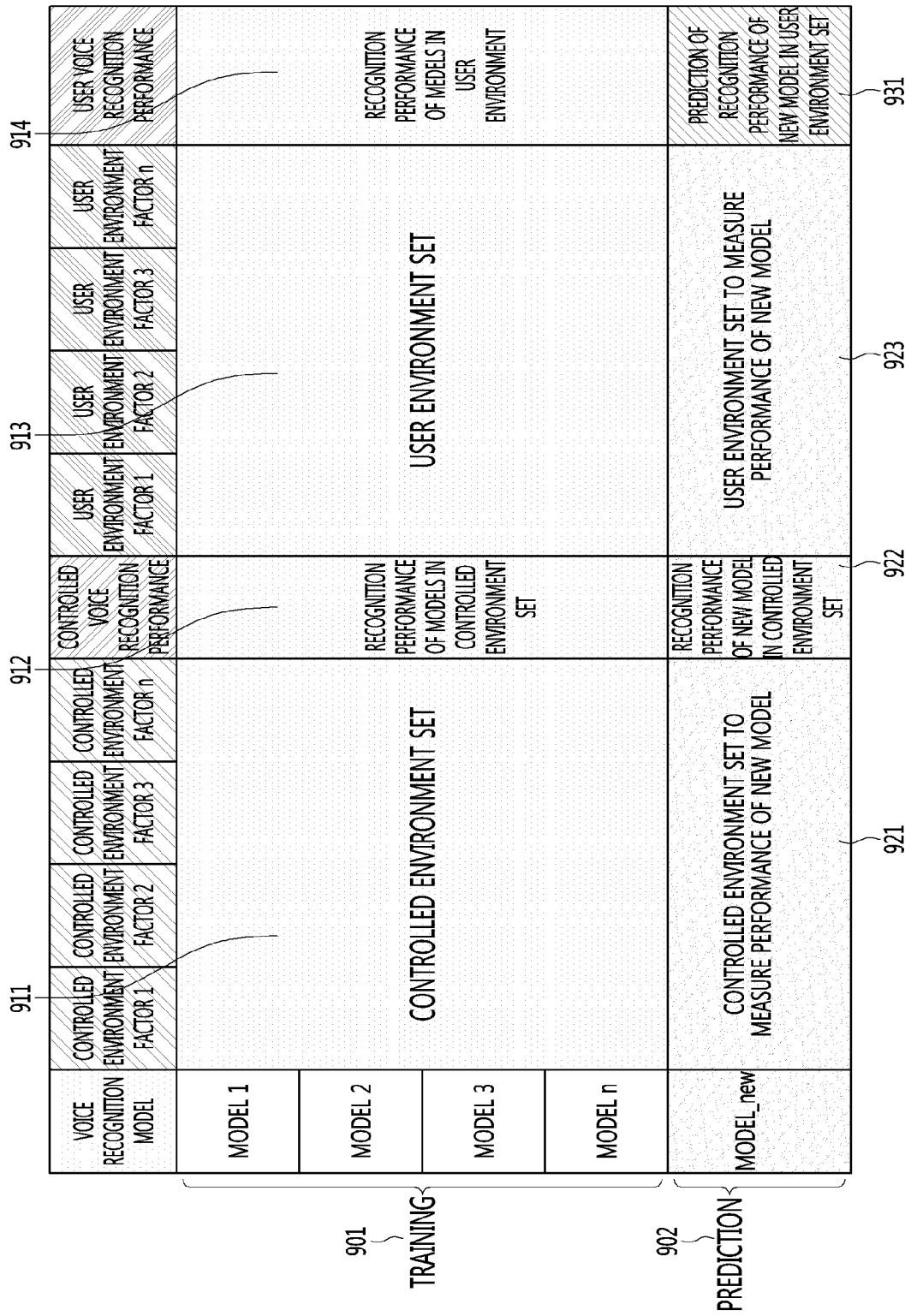
FIG. 9 is a view illustrating data used to train or utilize a performance prediction model according to an embodiment of the present invention.

FIG. 9 is a view illustrating data used to train or utilize a performance prediction model according to an embodiment of the present invention.

Referring to FIG. 9, training data 901 used to train the performance prediction model 801 may include controlled environment factors 911 corresponding to a controlled voice recognition environment, a controlled voice recognition performance 912 in the controlled voice recognition environment for each voice recognition model, user environment factors 913 corresponding to a user voice recognition environment, and a user voice recognition performance 914 in the user voice recognition environment for each voice recognition model.

Here, as described above, the user voice recognition performance 914 in each training data 901 is not included in the input feature vector of the performance prediction model 801, but is used as labeling information.

Since the present invention aims at predicting a voice recognition performance (a user voice recognition performance) in a user voice recognition environment for a new voice recognition model, the performance prediction model 801 may be learned using the training data 901 corresponding to various voice recognition models.

Specifically, when the controlled environment factors 911, the controlled voice recognition performance 912, and the user environment factors 913 included in the input data 901 are input, the performance prediction model 801 may generate and output a predicted value of the user voice recognition performance in the user voice recognition environment for the voice recognition model, corresponding to the input data 901. Further, this performance recognition model 801 may be learned in such a manner as to compare the output predicted value of the user voice recognition performance with the labeled user voice recognition performance 914 to reduce a difference therebetween.

The performance prediction model 801 thus learned may be used to predict a user voice recognition performance 931 for a new voice recognition model.

Input data 902 used to predict the user voice recognition performance 931 may include controlled environment factors 921 corresponding to a controlled voice recognition environment, a controlled voice recognition performance 922 in the controlled voice recognition environment measured for the new voice recognition model, and user environment factors 923 corresponding to a user voice recognition environment for measuring the recognition performance of the new voice recognition model.

Further, when the input data 902 for the new voice recognition model is input, the performance prediction model 801 may generate and output a predicted value of the user voice recognition performance for the new voice recognition model in the user voice recognition environment, corresponding to the input data 902.

Although the method for predicting the user voice recognition performance for the new voice recognition model using the learned performance prediction model 801 has been described above, the embodiments of the present invention may predict the user voice recognition performance for non-novel voice recognition models already used for the learning.

In this case, higher accuracy may be expected than the case of predicting the user voice recognition performance of the new voice recognition model.

The embodiments of the present invention distinguish the data collected in the controlled voice recognition environment and the data collected in the user voice recognition environment, which are both used in the training of the performance prediction model. Accordingly, the performance prediction model according to the present invention may predict the voice recognition performance in the user voice recognition environment with high accuracy only with the data collected in the controlled voice recognition environment for the new voice recognition model by comparing with the model predicting the voice recognition performance from a given environment factor.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence apparatus for predicting a performance of a voice recognition model in a user environment, the artificial intelligence apparatus comprising:
    a memory configured to store a performance prediction model; and
    a processor configured to:
        obtain first controlled environment data including first controlled environment factors corresponding to a first controlled voice recognition environment and a first controlled voice recognition performance of a target voice recognition model in the first controlled voice recognition environment;
        obtain first user environment factors corresponding to a first user environment, in which the performance is to be predicted;
        predict, using the performance prediction model, a first user voice recognition performance of the target voice recognition model in a first user voice recognition environment from the obtained first controlled environment data and the first user environment factors; and
        output the predicted first user voice recognition performance,
    wherein the first controlled voice recognition environment or controlled voice recognition environment is an environment designed in advance for measuring a controlled voice recognition performance,
    wherein the first user voice recognition environment or user voice recognition environment is an environment in which a user utilizes a voice recognition function, wherein the first user voice recognition environment or user voice recognition environment is not designed in advance,
    wherein the first controlled environment factors include at least one of an utterance distance, an utterance volume, an utterance direction, an echo, a noise, or a space size, corresponding to the first controlled voice recognition environment,
    wherein the first user environment factors include at least one of an utterance distance, an utterance volume, an utterance direction, an echo, a noise, or a space size, corresponding to the first user voice recognition environment,
    wherein the performance prediction model is learned using training data including second controlled environment factors corresponding to a second controlled voice recognition environment for a particular voice recognition model, a second controlled voice recognition performance of the particular voice recognition model in the second controlled voice recognition environment, second user environment factors corresponding to a second user voice recognition environment, and a second user voice recognition performance in the second user voice recognition environment for the particular voice recognition model, and
    wherein the performance prediction model is a model for generating a predicted value of the second user voice recognition performance in the second user voice recognition environment for the particular voice recognition model from the second controlled environment factors, the second controlled voice recognition performance, and the second user environment factors.

2. The artificial intelligence apparatus of claim 1, wherein the performance prediction model is learned to reduce an error between the second user voice recognition performance included in the training data and the predicted value of the voice recognition performance.

3. The artificial intelligence apparatus of claim 1, wherein the target voice recognition model is different from the voice recognition models used to learn the performance prediction model.

4. The artificial intelligence apparatus of claim 1, wherein the performance prediction model is learned by using a machine learning algorithm or a deep learning algorithm via the processor or an external artificial intelligence server.

5. A method for predicting a performance of a voice recognition model in a user environment, the method comprising:
    obtaining first controlled environment data including first controlled environment factors corresponding to a first controlled voice recognition environment and a first controlled voice recognition performance of a target voice recognition model in the first controlled voice recognition environment;
    obtaining first user environment factors corresponding to a first user environment in which the performance is to be predicted;
    predicting, using the performance prediction model, a first user voice recognition performance of the target voice recognition model in a first user voice recognition environment from the obtained first controlled environment data and the first user environment factors; and
    outputting the predicted first user voice recognition performance information,
    wherein the first controlled voice recognition environment or controlled voice recognition environment is an environment designed in advance for measuring a controlled voice recognition performance,
    wherein the first user voice recognition environment or user voice recognition environment is an environment in which a user utilizes a voice recognition function, wherein the first user voice recognition environment or user voice recognition environment is not designed in advance, wherein the first controlled environment factors include at least one of an utterance distance, an utterance volume, an utterance direction, an echo, a noise, or a space size, corresponding to the first controlled voice recognition environment, wherein the first user environment factors include at least one of an utterance distance, an utterance volume, an utterance direction, an echo, a noise, or a space size, corresponding to the first user voice recognition environment, wherein the performance prediction model is learned using training data including second controlled environment factors corresponding to a second controlled voice recognition environment for a particular voice recognition model, a second controlled voice recognition performance of the particular voice recognition model in the second controlled voice recognition environment, second user environment factors corresponding to a second user voice recognition environment, and a second user voice recognition performance in the second user voice recognition environment for the particular voice recognition model, and wherein the performance prediction model is a model for generating a predicted value of the second user voice recognition performance in the second user voice recognition environment for the particular voice recognition model from the second controlled environment factors, the second controlled voice recognition performance, and the second user environment factors.

6. The method of claim 5, wherein the performance prediction model is learned to reduce an error between the second user voice recognition performance included in the training data and the predicted value of the voice recognition performance.

7. The method of claim 5, wherein the target voice recognition model is different from the voice recognition models used to learn the performance prediction model.

8. The method of claim 5, wherein the performance prediction model is learned by using a machine learning algorithm or a deep learning algorithm via a processor or an external artificial intelligence server.

* * * * *